March 20, 1945.     H. C. BUCHMAN     2,372,156

GLASS SCREW CAP

Filed May 21, 1942

INVENTOR.
Harry C. Buchman.
BY
/ATTORNEYS

Patented Mar. 20, 1945

2,372,156

UNITED STATES PATENT OFFICE 2,372,156

GLASS SCREW CAP

Harry C. Buchman, Lancaster, Ohio, assignor to Anchor Hocking Glass Corporation, Lancaster, Ohio, a corporation of Delaware Application May 21, 1942, Serial No. 443,862

3 Claims. (Cl. 215—43)

My invention relates to a glass screw cap. It has to do, more particularly, with a novel screw cap made entirely of glass.

At the present time, screw caps for sealing glass containers, such as Mason jars, are made of metal. Due to the shortage of metal at the present time, there is a need for a glass screw cap. In making a screw cap of glass, a number of problems must be met which are not encountered in the making of metal screw caps. In the first place, the thread on the glass cap must be so formed that it will have a very smooth surface so that it will not grind on the thread of the glass jar which usually has a fairly rough surface, due to the fact that it is formed by contact with an iron mold. Furthermore, the thread on the glass lid must be very accurately formed so that it will cooperate properly with the thread on the glass jar.

One of the objects of my invention is to provide a glass screw cap which will be of an accurate predetermined dimension and which will have an accurate thread of predetermined pitch and size formed thereon.

Another object of my invention is to provide a glass screw cap which will have a thread formed thereon that will have an extremely smooth surface.

In its preferred form, my invention contemplates the provision of a screw cap made entirely of glass and of a suitable shape to fit the particular glass container upon which it is to be mounted. In this application, I disclose a glass lid of a type suitable for use on Mason jars. This lid comprises a substantially disk-like upper portion having a depending peripheral flange. This peripheral flange has a screw thread formed on its inner surface for cooperating with the threaded mouth of the jar. This thread is accurately formed. Each convolution of the thread is of curved cross-section and the spaces between the convolutions are also of curved cross-section. Thus, no sharp edges are present. Furthermore, the surface of the thread and the spaces therebetween are extremely smooth so that when the cap is screwed on the jar, the cooperating surfaces of the lid and jar will not grind on each other.

The preferred embodiment of my invention is illustrated in the accompanying drawing wherein similar characters of reference designate corresponding parts and wherein.

Figure 1:
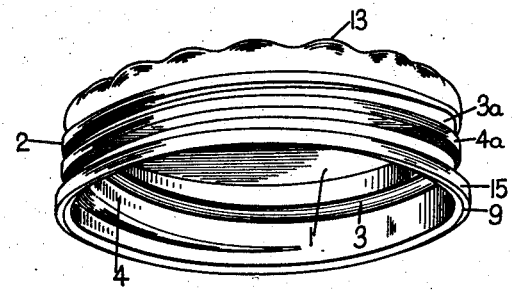
Figure 1 is a perspective view of a screw cap made according to my invention.

With reference to the drawing, I have illustrated a glass screw cap or lid which is of a type suitable for use on Mason jars. However, it is to be understood that my invention is not limited to this particular type of lid.

The lid is formed entirely of glass and comprises an upper substantially disk-like portion 1 which has a depending peripheral flange 2. This flange 2 has a thread 3 of accurate dimensions, pitch and shape formed on its inner surface. In forming the thread 3, a corresponding helical groove or indentation 3a is formed in the outer surface of the flange but this groove or indentation has no function in the use of the lid. Between the convolutions of the helical thread 3, a helical groove 4 is formed on the inner surface of the flange 2. In forming this groove 4 on the inner surface, a corresponding helical projection 4a is formed on the outer surface. It will be noted from the drawing, especially Figures 3 and 4, that the cross-section of the thread 3 and the groove 4 is curved such that no sharp edges are provided. The inner surface of the flange 2 thus consists of gradually sweeping curved surfaces similar to corrugations. It is important to eliminate sharp edges from the inner surface of the flange so that the lid will not grind on the cooperating portion of the jar 5. It will be noted that the jar shown has a threaded mouth portion 6 for cooperating with the thread 3. The surfaces of the thread 3 and the spaces 4 are extremely smooth so that they will not grind on the cooperating surfaces of the threads 6 on the jar which is usually formed in contact with an iron mold and consequently has a comparatively rough surface.

Figures 3, 4:
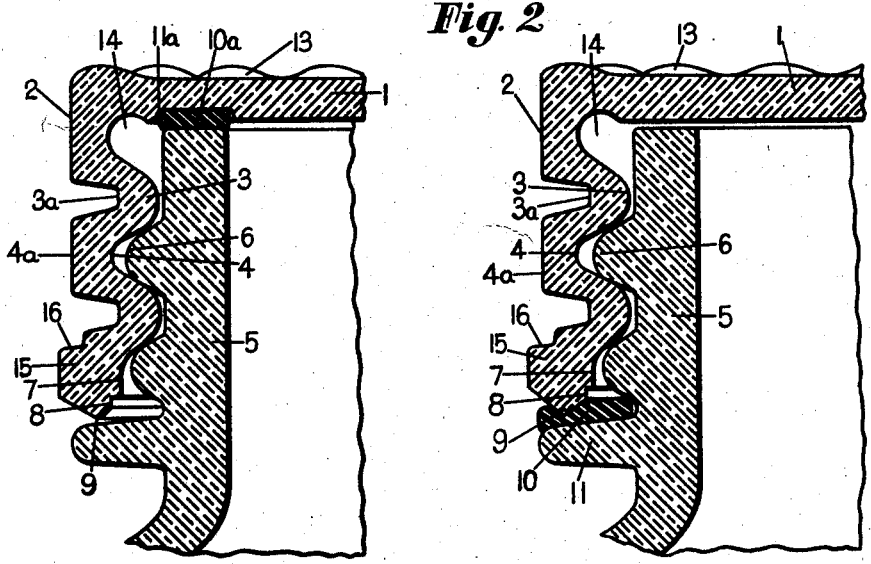
Figure 3 is a similar view but showing a cap of the type where the lower edge of the flange cooperates with the gasket.
Figure 4 is a vertical sectional view taken through the upper end of a container and a cooperating cap, showing a cap of the top seal gasket type.

The glass lid 1 has its inner surface diverging outwardly slightly at its lower end, as indicated at 7, so that it will readily telescope with the upper end of the jar. This diverging portion is not threaded. Furthermore, a slight recess 8 is provided at the lower inner edge of the flange to facilitate telescoping of the lid over the jar. The extreme lower edge of the flange has a fairly sharp edge 9 formed thereon. As shown in Figure 3, this edge 9 is adapted to cooperate with a compressible sealing gasket 10 which may be provided on a sealing ledge 11 usually formed on a jar of this type. It will be noted that the flange of the cap is of such depth that the top 1 will not contact with the upper edge of the jar when the lower edge of the flange is in sealing contact with the gasket 10.

In some cases, it may be desirable for the lid to have a gasket-receiving annular groove 11a formed in the inner surface of the disk-like portion 1 adjacent its periphery, as shown in Figure 4. This groove can receive a gasket 10a which will cooperate with the top edge of the jar to seal it.

The disk-like portion 1 of the lid may be provided with a corrugated or wavy edge 13 which will facilitate gripping of the cap in applying it to or removing it from the jar. It will also be noted from Figures 3 and 4 that the extreme lower portion 15 of the flange 2 is thicker than the remainder of the flange. This serves to make the portion 15 stronger which is desirable in case it is used as the sealing portion, in the manner shown in Figure 3. The upper edge of portion 15 is shouldered, as indicated at 16.

Figure 2:
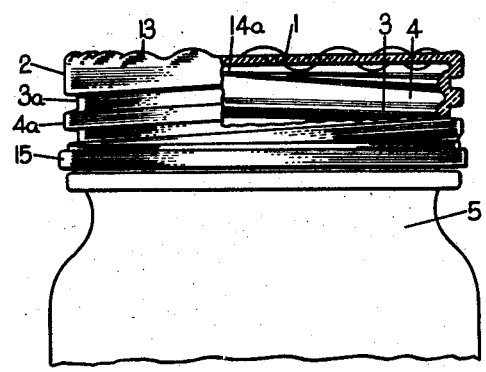
Figure 2 is a side elevational view, partly broken away, showing the cap in position on a container.

As shown in Figures 3 and 4, the top convolution 14 of the groove 4 extends upwardly and outwardly into the portion 1. This permits the thread 4 to be extended upwardly to a point 14a (Figure 2) approximately at the level of the lower surface of the top portion 1.

When the glass lid is mounted on the jar, the unthreaded lower portion 7 is slipped over the upper end of the jar and the lid will telescope over the jar until the lowermost thread of the lid contacts with the uppermost thread on the jar. Then the lid can be threaded onto the jar in the same manner as a metal lid. The thread on the inner surface of the lid will be accurately formed to a predetermined dimension and pitch. Furthermore, it will have an extremely smooth surface.

It will be apparent from the above description that I have provided a glass lid having many advantages. A number of these advantages have been specifically referred to and others will be apparent.

Having thus described my invention, what I claim is:

1. A glass screw cap for containers, comprising a body, a peripheral flange depending from the body and terminating in a thickened reinforcing portion at its free edge, said flange having helical alternate projections and grooves formed in its opposite faces between the body and said thickened flange portion, said projections and grooves on said opposite faces being of different cross-sectional shape, the inner alternate helical projections and grooves being reversely curved and merging with one another to present smooth rounded surfaces and the outer spaced helical projections having straight coplanar outer faces, said internal groove adjacent the thickened reinforcing portion of said flange terminating in a substantially straight portion providing the inner wall of said thickened flange portion, said thickened reinforcing flange portion having a flat outer face extending outwardly beyond and in a plane substantially parallel to the plane of said co-planar outer faces, said thickened reinforcing portion having an annular internal recess beyond said substantially straight portion, the base of said thickened reinforcing portion extending downwardly and inwardly in a straight line at a relatively sharp angle with relation to the flat outer face of the thickened portion and then upwardly and outwardly in a straight line at a different angle and terminating at the lower edge of said internal recess to provide a relatively sharp annular depending container seal-engaging projection.

2. A glass screw cap according to claim 1 wherein the top surface of the body of said cap at the juncture of said body and peripheral flange is provided with a series of smooth-surfaced upstanding outward projections forming gripping surfaces for the cap.

3. A glass screw cap according to claim 1 wherein the body of said cap is of disk-like formation and wherein the under face of said formation is provided with a gasket-receiving annular groove spaced inwardly from said flange.

HARRY C. BUCHMAN.